(12) United States Patent
Djukic et al.

(10) Patent No.: US 9,755,901 B2
(45) Date of Patent: Sep. 5, 2017

(54) SYSTEM AND METHOD FOR A SOFTWARE DEFINED PROTOCOL NETWORK NODE

(71) Applicant: Huawei Technologies Co., Ltd., Shenzhen (CN)

(72) Inventors: Petar Djukic, Ottawa (CA); Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 463 days.

(21) Appl. No.: 14/160,146

(22) Filed: Jan. 21, 2014

(65) Prior Publication Data
US 2015/0207717 A1    Jul. 23, 2015

(51) Int. Cl.
*G06F 15/177*   (2006.01)
*H04L 12/24*    (2006.01)
*H04L 12/26*    (2006.01)

(52) U.S. Cl.
CPC ........ *H04L 41/082* (2013.01); *H04L 41/0823* (2013.01); *H04L 43/0876* (2013.01)

(58) Field of Classification Search
CPC  H04L 41/082; H04L 41/0823; H04L 43/0876
See application file for complete search history.

(56) References Cited

U.S. PATENT DOCUMENTS

| | | | |
|---|---|---|---|
| 7,099,291 B2 | 8/2006 | Harris et al. | |
| 7,203,169 B1* | 4/2007 | Okholm | H04L 41/0803 370/232 |
| 8,054,855 B1* | 11/2011 | Deshpande | H04L 12/2856 370/392 |
| 9,106,527 B1* | 8/2015 | Cook | H04L 41/08 |
| 2004/0156375 A1 | 8/2004 | Takabatake | |
| 2005/0120122 A1* | 6/2005 | Farnham | H04L 69/32 709/230 |
| 2008/0172730 A1* | 7/2008 | Sandhu | H04L 63/06 726/9 |
| 2009/0138577 A1* | 5/2009 | Casado | H04L 41/06 709/220 |
| 2010/0124933 A1* | 5/2010 | Chowdhury | H04L 12/5695 455/453 |
| 2011/0276685 A1 | 11/2011 | de Waal et al. | |
| 2012/0128004 A1* | 5/2012 | Aybay | G06F 13/4022 370/401 |
| 2012/0155453 A1* | 6/2012 | Vohra | H04L 41/0823 370/352 |

(Continued)

FOREIGN PATENT DOCUMENTS

| | | |
|---|---|---|
| EP | 2984784 A1 | 2/2016 |
| WO | 2013104375 A1 | 7/2013 |
| WO | 2014166402 A1 | 10/2014 |

OTHER PUBLICATIONS

Tennenhouse, D. L., et al., "A Survey of Active Network Research," IEEE Communications Magazine, vol. 35, No. 1, Jan. 1997, pp. 80-86.

(Continued)

*Primary Examiner* — Jonathan Bui
(74) *Attorney, Agent, or Firm* — Slater Matsil, LLP

(57) ABSTRACT

A software designed protocol (SDP) network node includes a receiver, and a processor operatively coupled to the receiver. The receiver receives instructions, and receives packets. The processor updates a configuration of the SDP network node in accordance with the received instructions, and processes the received packets.

21 Claims, 11 Drawing Sheets

(56) References Cited

U.S. PATENT DOCUMENTS

| | | | | |
|---|---|---|---|---|
| 2012/0167162 A1* | 6/2012 | Raleigh | ................... | G06F 21/57 726/1 |
| 2013/0166914 A1* | 6/2013 | Vandervort | ........... | H04L 9/3247 713/176 |
| 2013/0259045 A1* | 10/2013 | Johansson | ............. | H04L 45/306 370/392 |
| 2014/0226466 A1* | 8/2014 | Pettersson | ............... | H04L 69/22 370/229 |
| 2014/0310388 A1 | 10/2014 | Djukic et al. | | |

OTHER PUBLICATIONS

Schmidt, D. C., et al., "Adaptive: A Dynamically Assembled Protocol Transformation, Integration, and eValuation Enviroment," Concurrency: Practice and Experience, vol. 5, Issue 4, Jun. 1993, pp. 269-286.

Henke, C., et al., "Network Functional Composition: State of the Art," Telecommunication Networks and Applications Conference (ATNAC), 2010 Australasian, Oct. 31, 2010-Nov. 3, 2010, pp. 43-48.

Dutta, R., et al., "The SILO Architecture for Services Integration, controL, and Optimization for the Future Internet," Communications Society, IEEE International Conference, Jun. 24-28, 2007, pp. 1899-1904.

International Search Report and Written Opinion of Patent Cooperation Treaty (PCT), International Application No. PCT/US15/11914, Applicant Huawei Technologies Co., Ltd., date of mailing Apr. 17, 2015.

ONF, "OpenFlow Switch Specification", Version 1.3.2 (Wire Protocol 0x01), Apr. 25, 2013, pp. 1-131.

* cited by examiner

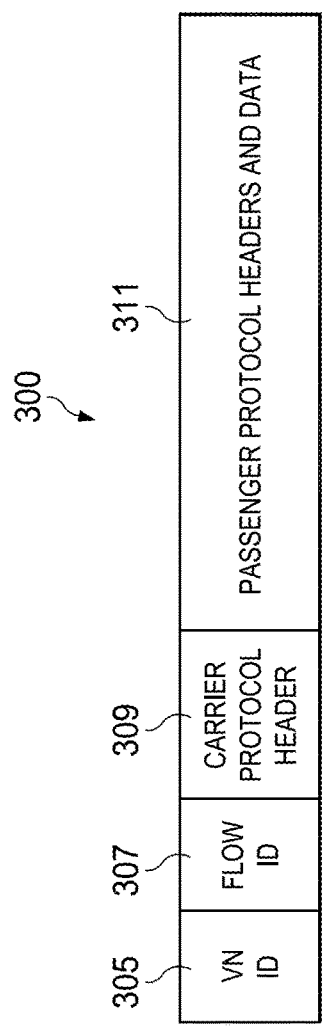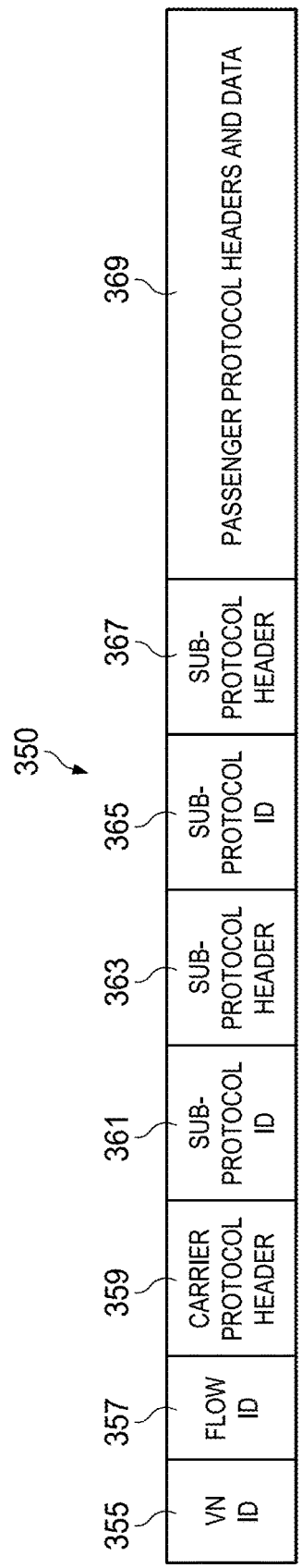
FIG. 3A
FIG. 3B

continued
SYSTEM AND METHOD FOR A SOFTWARE DEFINED PROTOCOL NETWORK NODE

TECHNICAL FIELD

The present disclosure relates generally to digital communications, and more particularly to a system and method for a software designed networking (SDN) network node.

BACKGROUND

Current network data plane protocol is based on an end-to-end 7-layer protocol stack. There is an independent process within each layer and interaction between independent layers is via primitives between layers. Many of the functions of end-to-end data plane process co-exist with lower layer per link data process function in the network. The current protocol stack is fixed over session(s) and pre-configured, which cannot adapt to network status changes. The current protocol stack design provides a limited number of options that prevents it from the tightly matched provisioning of per application quality of experience (QoE). The current protocol stack design does not take the software design networking (SDN) concept into the consideration, which prevents it from fully exploiting the benefits of SDN. The current protocol stack treats all end-to-end hosts the same, but many new and/or future services and/or applications, e.g., machine-to-machine (M2M) communications, may require a custom protocol stack.

SUMMARY OF THE DISCLOSURE

Example embodiments of the present disclosure which provide a system and method for a software designed networking (SDN) network node.

In accordance with an example embodiment of the present disclosure, a software designed protocol (SDP) network node is provided. The SDP network node includes a receiver, and a processor operatively coupled to the receiver. The receiver receives instructions, and receives packets. The processor updates a configuration of the SDP network node in accordance with the received instructions, and processes the received packets In accordance with another example embodiment of the present disclosure, a method for operating a software designed protocol (SDP) network node is provided. The method includes receiving, by the SDP network node, processing instructions, and receiving, by the SDP network node, a first packet. The method also includes classifying, by the SDP network node, the first packet in accordance with identifying information in the first packet, and processing, by the SDP network node, the first packet in accordance with the processing instructions.

In accordance with another example embodiment of the present disclosure, a software designed protocol (SDP) network node is provided. The SDP network node includes a receiver, and a processor operatively coupled to the receiver. The receiver receives processing instructions, and receives a packet. The processor classifies the packet in accordance with identifying information in the packet, and processes the packet in accordance with the processing instructions.

One advantage of an embodiment is that flexibility in a data plane is improved, for example, protocols may be added and/or modified after equipment installation, finer protocol features are possible, and the like.

A further advantage of an embodiment is that efficiency in a data plane is improved, for example, unnecessary functionality may be removed, and the like.

BRIEF DESCRIPTION OF THE DRAWINGS

For a more complete understanding of the present disclosure, and the advantages thereof, reference is now made to the following descriptions taken in conjunction with the accompanying drawing, in which:

FIGS. 3a and 3b illustrate a first example carrier meta-protocol packet format and a second example carrier meta-protocol packet format according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to a SDN network node. For example, software designed protocol (SDP) network node receives instructions, and receives packets. The SDP network node also updates a configuration of the SDP network node in accordance with the received instructions, and processes the received packets.

The present disclosure will be described with respect to example embodiments in a specific context, namely software defined networks. The disclosure may be applied to standards compliant SDNs and non-standards compliant SDNs.

Future networks generally will combine traffics with multiple types of service or even nature (e.g. video traffic and M2M traffic). To optimize the network performance and provide services to a variety of coexisting quality of service (QoS) classes, future networks likely will require centralized management with software defined networking (SDN) techniques to accomplish all of their QoS objectives. However, even with SDN, the performance of the networks is still limited by their underlying protocols.

Figure 1:
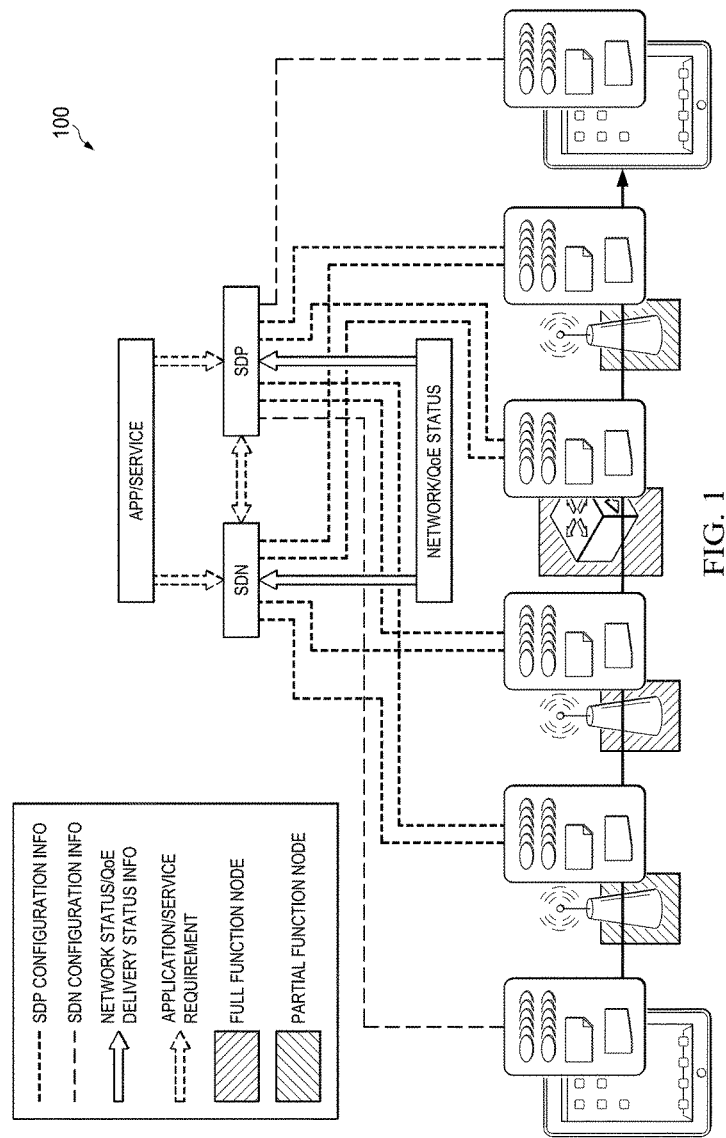
FIG. 1 illustrates an example SDP and SDN interaction with a data plane process function breakdown according to example embodiments described herein.

FIG. 1 illustrates an example software defined protocols (SDP) and SDN interaction 100 with a data plane process function breakdown. There are multiple types of nodes with different capabilities of data process functionalities. A centralized SDP manager controls the end to end data plane process, from data source to data sink, between network edges, and the like. There is tight interaction between SDN and SDP.

Figure 2:
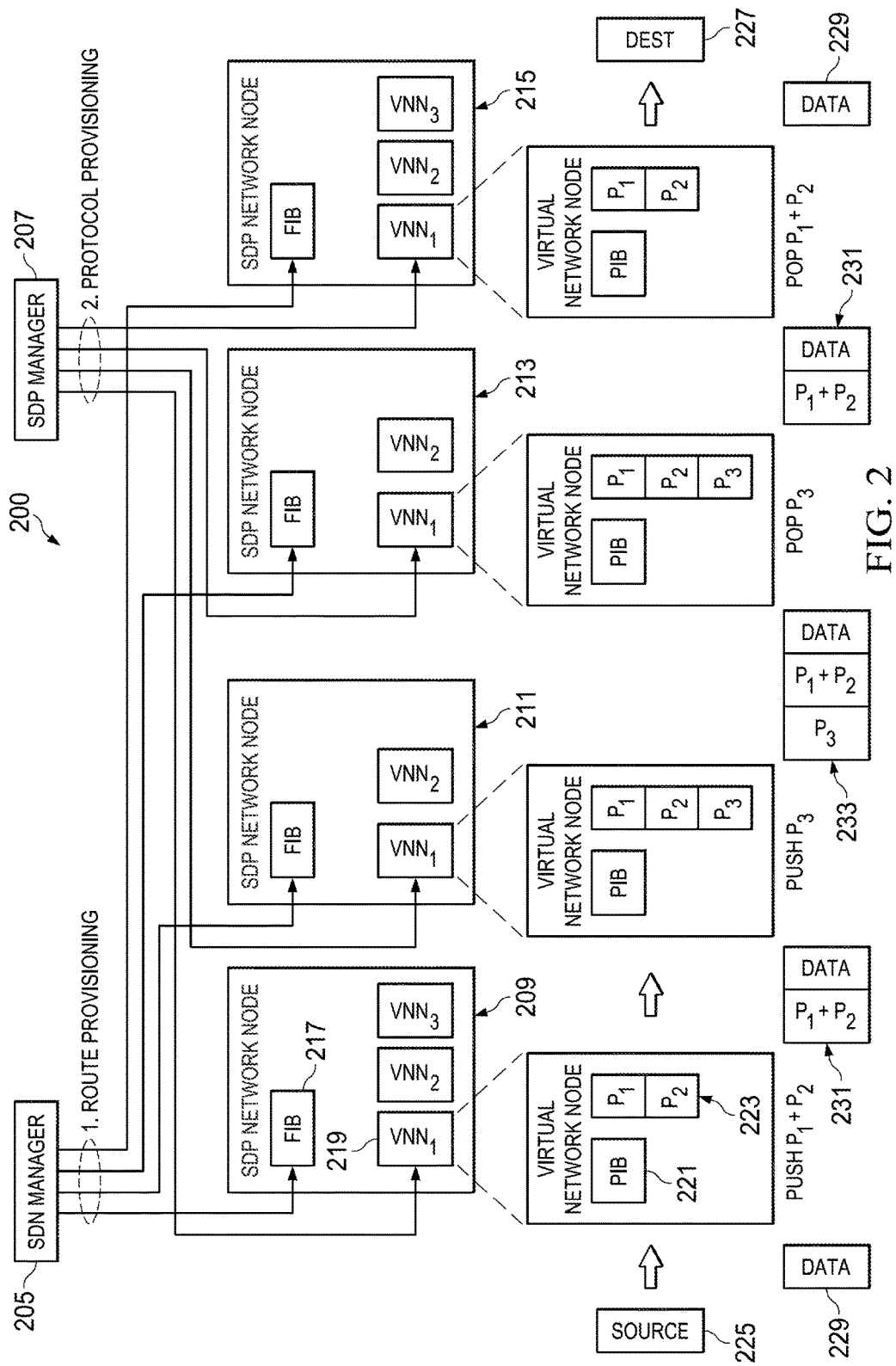
FIG. 2 illustrates an example communications system according to example embodiments described herein.

FIG. 2 illustrates an example communications system 200. Communications system 200 may be a SDN communications system. Communications system 200 includes a SDN manager 205, a SDP manager 207, and a plurality of SDP network nodes, such as SDP network nodes 209-215. SDN manager 205 may determine a path (i.e., a sequence of SDP network nodes for a traffic flow from source to destination) and provide information to configure a forwarding information base (FIB) that is used to forward packets to virtual network nodes within a SDP network node in the path of the traffic flow. The FIB may be stored in the SDP network nodes, such as in FIB 217.

SDP manager 207 may determine a protocol(s) for the traffic flow and set up SDP network nodes along the path to implement the protocols. If one of the SDP network nodes does not already support the protocol(s) for the traffic flow, SDP manager 207 may provide processing instructions, including software description(s) for implementing the protocol(s), workflow sequence description(s), packet flow identifier(s) and protocol(s), and the like, to the SDP network nodes. SDP manager 207 may provide the processing instructions to each of the SDP network nodes in the path.

A SDP network node, such as SDP network node 209, may implement one or more virtual network nodes (VNN), such as VNN 219. A VNN may be a virtualization of a SDP network node and may include a protocol information base (PIB) 221 and one or more protocols, such as protocol 223. Each VNN may implement protocols required by one virtual private network (VPN). As an example, if a VNN supports 2 protocols, the SDP network node may include at least 2 VNNs. As shown in FIG. 2, SDP network node 209 supports 3 protocols and includes 3 VNNs, including VNN 219. The SDP network node may also implement software descriptions of a protocol(s) as provided by a SDP manager. The SDP network node may apply the software description of the protocol(s) to receive packets. The SDP network node may also receive packet flow identifiers and/or protocols, where the packet flow identifiers may be associated with the protocols.

A source 225 may inject a packet 229 into communications system 200. Packet 229 may include, among other things, data. Packet 229 is received at SDP network node 209 and processed by VNN 219, which according to PIB 221 is processed by protocol stack implementation 223. Processing by protocol stack implementation 223 adds headers $P_1$ and $P_2$ (shown collectively has header 231) to packet 229, for example. Packet 229, as modified by SDP network node 209, is received at SDP network node 211. Processing by a VNN in SDP network node 211 adds header $P_3$ 233 to packet 229, for example. Packet 229, as modified by SDP network node 211, is received at SDP network node 213. Processing by a VNN in SDP network node 213 removes header $P_3$ from packet 229, leaving headers $P_1$ and $P_2$ (shown collectively as header 231), for example. Packet 229, as modified by SDP network node 213, is received at SDP network node 215. Processing by a VNN in SDP network node 215 removes headers $P_1$ and $P_2$ from packet 229, leaving, among other things, the data. Packet 229 is provided to destination 227, for example.

According to an example embodiment, a SDP manager, such as SDP manager 207, may maintain a database of SDP network node capabilities and status information. The database of the capabilities of the SDP network node may include information such as processing speed, number of processor, ability to update protocol software, types of supported protocol operations (e.g., system operating system, hardware version, and the like), and the like. The data of the status information of the SDP network node may include measured processing speed, load, protocol status information (e.g., window sizes, buffer sizes, latency, error rate, and the like). The SDP manager may manage SDP network nodes in a virtual network or the SDP network nodes may come and go depending on mobility and/or power status.

The information stored in the database may be entered by operators of the communications system, although it may be infeasible due to number. A dynamic discovery mechanism may be used in order to support a dynamically changing communications system. As an illustrative example, the SDP manager may send a probe message to query SDP network nodes about their capabilities and/or status. As an alternative illustrative example, the SDP network nodes may periodically (or upon occurrence of an event, such as a change in capability and/or status) send information about the capabilities and/or status.

According to an example embodiment, the SDP manager may provision software SDP network nodes for packet processing. The SDP manager may send protocol software update(s) to the SDP network nodes (if a SDP network node has the hardware capability but no software capability, or a general update). The SDP manager may ensure that the software versions of protocols are consistent on all SDP network nodes in a path. The SDP manager may decide which SDP network nodes should implement which software protocol stack for which end-to-end flow. The SDP manager may set up forwarding tables to map flow identifiers to software defined protocol stack. The SDP manager may set up the protocol stack by sending instructions for protocol stack configuration, including atomic protocol layers, layer ordering, parameters of protocols (such as maximum window size, minimum window size, and the like).

According to an example embodiment, the SDP manager may transmit messages in a variety of formats. The messages may be in a binary format, a plain text format, an extensible markup language (XML) format, and the like. As an illustrative example, a message from the SDP manager used for software upgrade and/or installation may include a list of protocols in the software update, a digital signature of the SDP manager for use in verification of the SDP manager, an encryption hash for use in verification of the software update, and the software in a binary format, byte-code format, text script, and the like. As another illustrative example, a message from the SDP manager used to setup a new packet flow may include a packet flow identifier, a packet flow priority, a list of protocols to apply on the packet flow in order (i.e., a working flow), instructions to read the protocol sub-tags, and the like. As yet another illustrative example, a message from the SDP manager used to tear-down a packet flow may include a packet flow identifier, and the like.

According to an example embodiment, a SDP network node, such as SDP network node 209, may receive messages from the SDP manager and implement a data plane as instructed in the messages. Data plane protocol may utilize a meta-carrier protocol. As an illustrative example, protocol processing by the SDP network node may use a hardware architecture that supports massively parallel processing for multiple protocols using sequential or layered protocol processing. Mixed processing may also be possible by scheduling some packet flows for sequential (silo) processing and some packet flows for parallel and/or layered processing. As another illustrative example, cross-layered information exchange and cross-layered protocol processing may be supported through a mechanism using a shared protocol database. A shared database of connection properties may be accessible by each layer. As yet another illustrative example, some protocol layer implementations may be installed on SDP network nodes include atomic operations (including in-sequence delivery, reliable delivery, congestion control, compression, encryption, and the like), complex operations (including in-sequence and reliable delivery, in-sequence and reliable delivery with congestion control, and the like), network services (such as firewalls, flow aggregation, and the like), content processing (such as video stream compression, and the like), and so on. Protocol prioritization may be supported with queue scheduling and resource assignments on the SDP network node.

According to an example embodiment, carrier meta-protocol may contain information for the processing of packets in the SDP network node. As an example, the information in the protocol is used to identify packet flows and their protocol processing workflow. FIGS. 3a and 3b illustrate a first example carrier meta-protocol packet format 300 and a second example carrier meta-protocol packet format 350. A virtual network identifier (VN ID) fields 305 and 355 may contain an identifier (the VN ID) used to identify virtual networks. The VN ID may be a separate value independent of a flow identifier (flow ID) contained in flow ID fields 307 and 357 or the VN ID may be inferred or embedded in the flow ID, which may allow for the omission of VN ID fields 305 and 355. Flow ID fields 307 and 357 may be used to identify end-to-end connections and/or services. The SDN manager may setup a virtual circuit using the flow ID before a first packet is received. Examples of identifiers that may be used as the flow ID include an Internet protocol based 5-tupple, an application and/or service identifier, a virtual LAN (VLAN) network tag, a multiprotocol label switching (MPLS) tag, a private virtual network tag (8-bit, 16-bit, 32-bit, and the like), a magnetic link (such as a universal resource locator (URL) hashed to an integer value), a group of any combination of those values encrypted and/or compressed and/or hashed, and the like. It is noted that packets may be forwarded without examining the headers to bypass protocol processing.

Carrier meta-protocol packet format 300 may also include a carrier protocol header field 309 that carries combined information about protocols in the packet flow's protocol workflow. Carrier meta-protocol packet format 300 may also include information about the state of the carrier's protocol stack, stored in a passenger protocol headers and data field 311, for example. Carrier meta-protocol packet format 350 may also include a carrier protocol header field 359 that carries combined information about protocols in the packet flow's protocol workflow. Carrier meta-protocol packet format 350 may also include separate headers of different sub-protocols for enhanced layering capabilities, for example, in sub-protocol ID field 361, sub-protocol header field 363, sub-protocol ID field 365, and sub-protocol header field 367. Typically, a sub-protocol ID contains an identifier of an atomic sub-protocol to apply to the packet flow and a sub-protocol header contains information about the protocol identified with the sub-protocol ID. A passenger protocol headers and data field 369 may carry additional information about the protocol workflow for the packet flow. Sub-protocol IDs and sub-protocol headers may be pushed (added) or popped (removed) from a packet at each hop. Sub-protocol headers may identify protocols in a stack, or a tag may identify protocols in the stack.

Figure 4:
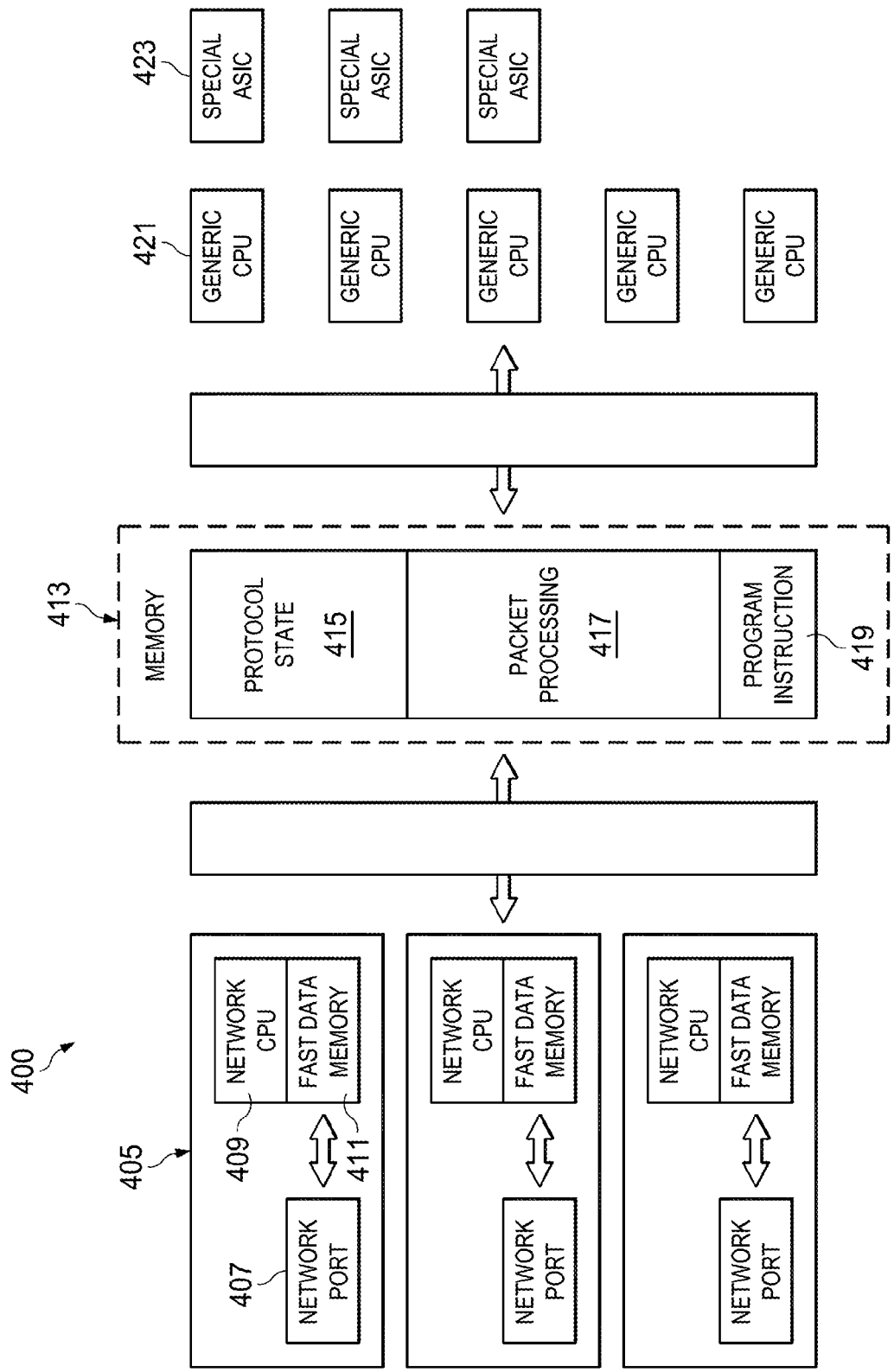
FIG. 4 illustrates architecture of an example SDP network node according to example embodiments described herein.

FIG. 4 illustrates architecture of an example SDP network node 400. SDP network node 400 includes a plurality of network interface (NICs), such as NIC 405, that receive and send packets. The NICs may be instructed, by a SDP manager, for example, about packet forwarding and processing. As an example, some packets may be passed for further protocol processing, while other packets may be forwarded to another NIC. In general, NICs on a single SDP network node may support multiple wired or wireless protocol types, such as Ethernet, IEEE 802.3, IEEE 802.11, IEEE 802.16, Third Generation Partnership (3GPP) Long Term Evolution (LTE), 3GPP LTE-Advanced, and the like. A NIC, such as NIC 405, may include a network port 407 that allows for connectivity to a communications system, a central processing unit (CPU) 409 to provide processing capability, and fast data memory 411 to store received packets. The NIC may transfer some packets to memory 413 for protocol processing if a FIB associated with the packets instructs the NIC to do so. It may be possible to have some SDP network nodes without FIBs so that all packets are transferred to memory 413 for protocol processing.

Memory 413, which may be implemented using random access memory (RAM), may store packets, as well as protocol state 415, packet processing software and/or scratch memory 417, software 419, and the like. SDP network node 400 may also include a plurality of generic CPUs, such as generic CPU 421, which provide processing capabilities to process packets utilizing memory 413. The generic CPUs may be grouped into a global processing unit (GPU). Alternatively, it may be possible to use separate memories and/or high-speed links or buses for the generic CPUs. Parallel processing may be supported by SDP network node 400 utilizing a cross flow (i.e., vertical parallelism), across layers (i.e., horizontal parallelism), or a combination thereof. Special application specific integrated circuits (ASICs), such as special ASIC 423, may provide processing capability for special processing. As an example, a ternary content addressable memory (TCAM) may provide fast address lookup or a digital signal processor (DSP) core may radio signal processing.

Figure 5:
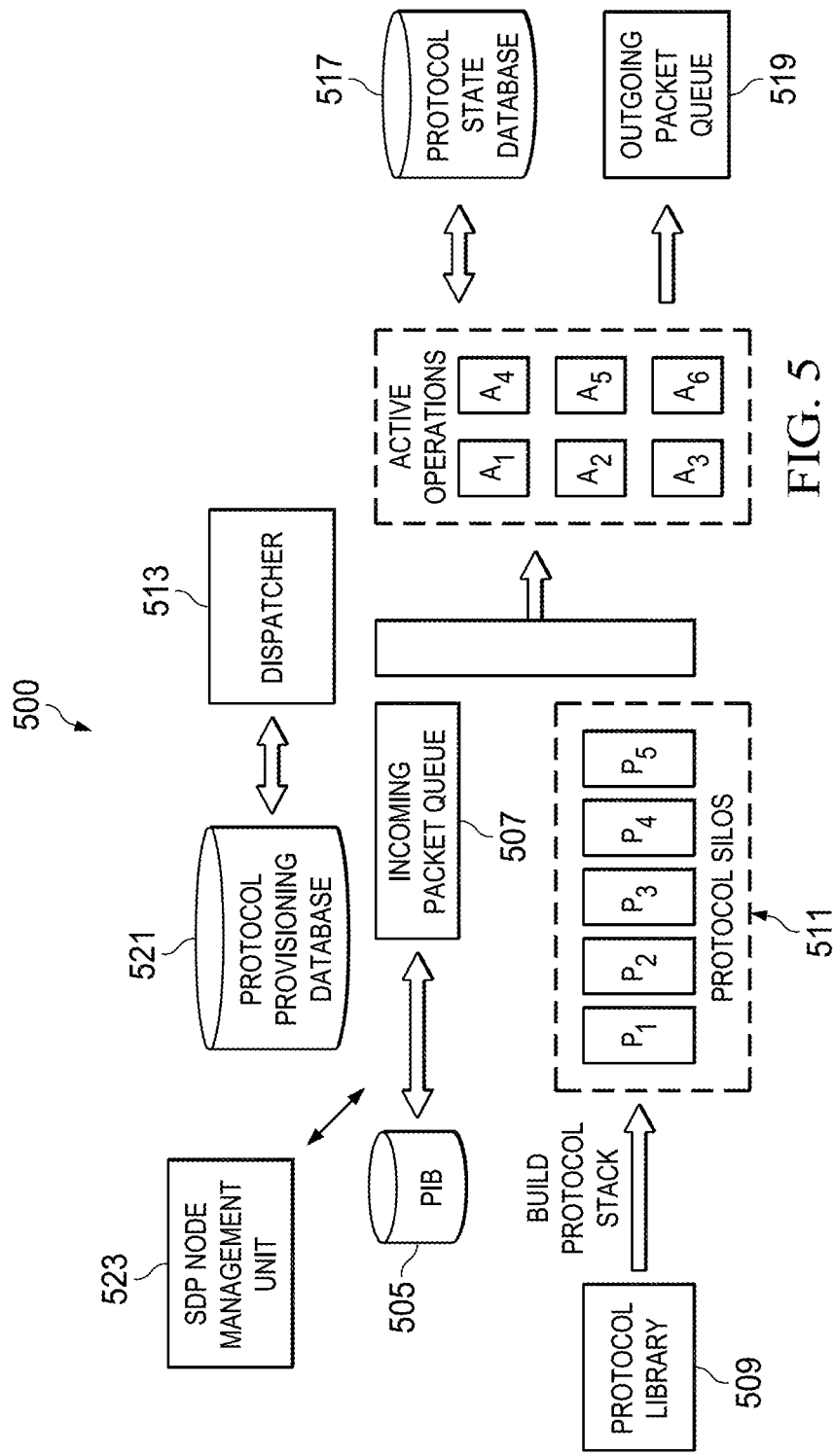
FIG. 5 illustrates architecture of a first example software protocol engine according to example embodiments described herein.

FIG. 5 illustrates architecture of a first example software protocol engine 500. Software protocol engine 500 features monolithic processing. Software protocol engine 500 may be a virtual machine or shared among multiple packet flows. Software protocol engine 500 may be shared among multiple VNNs or packet flows of multiple VNNs. Software protocol engine 500 includes a PIB 505 that may be used to determine how to transfer some received packets for protocol processing and send some received packets to other SDP network nodes. The received packets transferred for protocol processing may be stored in an incoming packet queue 507 where they wait protocol processing. A protocol library 509 includes protocols supported by software protocol engine 500, although not all supported protocols may be active. A protocol stack 511 includes stacks for the active protocols. A dispatcher 513 may dispatch packets stored in incoming packet queue 507 to their corresponding protocols for protocol processing in protocol silos of protocol stack 511. Results of protocol processing may be stored in a protocol state database 517 and packets that are to continue to their destinations may be placed in an outgoing packet queue 519 to await subsequent sending to other SDP network nodes. A protocol provisioning database 521 may store software, instructions, parameters, and the like, for protocols supported by software protocol engine 500. Protocol provisioning database 521 may also store software, updates, upgrades, and the like, for protocols not yet implemented in software protocol engine 500. Software protocol engine 500 also includes a SDP node management unit 523. SDP node management unit 523 may receive instructions from a SDP manager, configure software protocol engine 500 in accordance with the instructions from the SDP manager, and the like, with some of the instructions potentially referring to associations of packet flows with protocol stacks, and other instructions potentially referring to prioritization of flows in dispatcher 513 and/or the protocols themselves. SDP node management unit 523 may be operatively coupled to PIB 505, protocol provisioning database 521, and dispatcher 513.

According to an example embodiment, the protocol silos may be dynamically built when the SDP network node is notified of a new packet flow. The protocol silos may contain an ordered list of functions, which implement each protocol in protocol stack 511. Packet flow to protocol mapping may be stored in PIB 505. Protocols use protocol state database 517 to keep track of their state, which may enable sharing across layers. Examples of information stored in protocol state database 517 include packet sequence numbers, available packet credits, security keys, queue length, window size, head of line (HOL) delay, queued packet types, and the like.

According to an example embodiment, dispatcher 513 manages and coordinates resources. As an example, dispatcher 513 may select which packets to process and select a CPU and/or ASIC to serve the selected packet. Dispatcher 513 may invoke an assigned protocol silo for the selected packet. Dispatcher 513 may handover packets from incoming packet queue 507 to CPU (shown as active operations) and from CPU to outgoing packet queue 519. Dispatcher 513 may apply flow priorities by scheduling packets in incoming packet queue 507 and outgoing packet queue 519, it may also assign processors (CPUs and/or ASICs) to distinguish protocol priority. If software protocol engine 500 is shared, dispatcher 513 may include a virtual machine hypervisor. Dispatcher 513 may consider virtual network identifiers for scheduling if it is operating in a shared manner.

Figure 6:
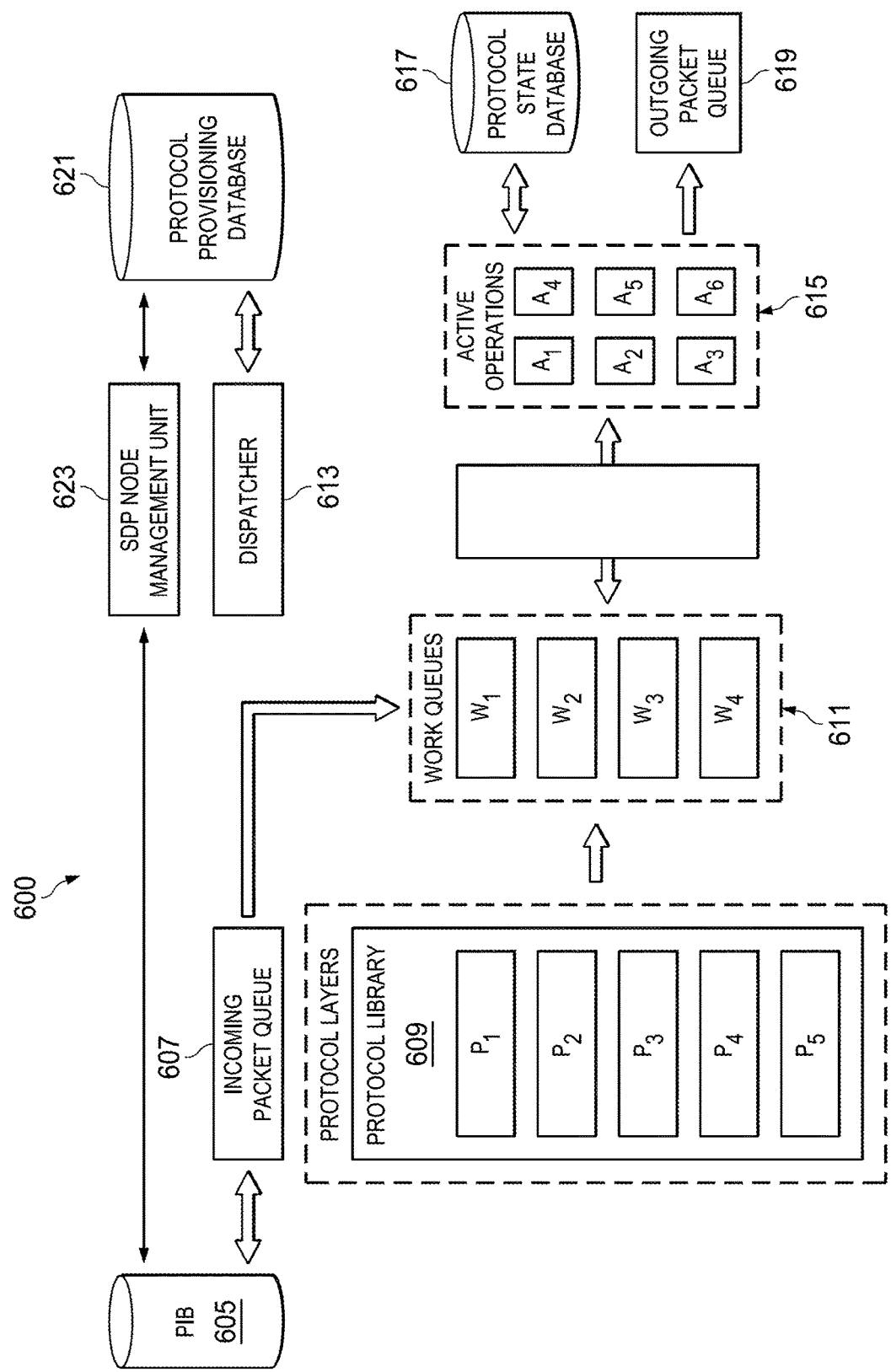
FIG. 6 illustrates architecture of a second example software protocol engine according to example embodiments described herein.

FIG. 6 illustrates architecture of a second example software protocol engine 600. Software protocol engine 600 features layered processing. Software protocol engine 600 includes a PIB 605 that may be used to determine how to transfer some received packets for protocol processing and send some received packets to other SDP network nodes. The received packets transferred for protocol processing may be stored in an incoming packet queue 607 where they wait protocol processing. A protocol library 609 includes protocols supported by software protocol engine 600, although not all supported protocols may be active. A work queue 611 includes queues for the active protocols. A dispatcher 613 may dispatch packets stored in incoming packet queue 607 to their corresponding protocols for protocol processing in work queues of work queue 611. Packets may be processed layer by layer. For each layer, dispatcher 613 may select an available CPU (shown as active operations, such as active operation 615, for example). Results of protocol processing may be stored in a protocol state database 617 and packets that are to continue to their destinations may be placed in an outgoing packet queue 619 to await subsequent sending to other SDP network nodes. A protocol provisioning database 621 may store software, instructions, parameters, and the like, for protocols supported by software protocol engine 600. Protocol provisioning database 621 may also store software, updates, upgrades, and the like, for protocols not yet implemented in software protocol engine 600.

Dispatcher 613 may use protocol provisioning database 621 to dynamically determine a next layer for processing, after a current layer being processed is complete. In general, dispatcher 613 manages and coordinates resources. As an example, dispatcher 613 may select which packet to process using flow priorities to select the packet, dispatcher 613 may select which work queue to place the packet using the packet's priority to select the work queue, dispatcher 613 may invoke assigned protocols on the packets by either using the protocol header or by referring to PIB 605. As another example, dispatcher 613 may schedule processing on CPUs for each packet with one processing thread per protocol layer per packet flow. As yet another example, dispatcher 613 may handover packets from work queue 611 to CPU and back to work queue 611, as well as handover packets from CPU to outgoing packet queue 619. Software protocol engine 600 also includes a SDP node management unit 623. SDP node management unit 623 may receive instructions from a SDP manager, configure software protocol engine 600 in accordance with the instructions from the SDP manager, and the like, with some of the instructions potentially referring to associations of packet flows with protocol stacks, and other instructions potentially referring to prioritization of flows in dispatcher 613 and/or the protocols themselves. SDP node management unit 623 may be operatively coupled to PIB 605, protocol provisioning database 621, and dispatcher 613.

According to an example embodiment, horizontal parallelism may be able to achieve better load balancing by assigning more CPUs to heavily loaded layers and fewer CPUs to lightly loaded layers. Dispatcher 613 may apply flow priorities by scheduling incoming packet queue 607 and outgoing packet queue 619. Dispatcher 613 may also assign CPUs to distinguish protocol priority. Dispatcher 613 may also include a virtual machine hypervisor.

Figure 7:
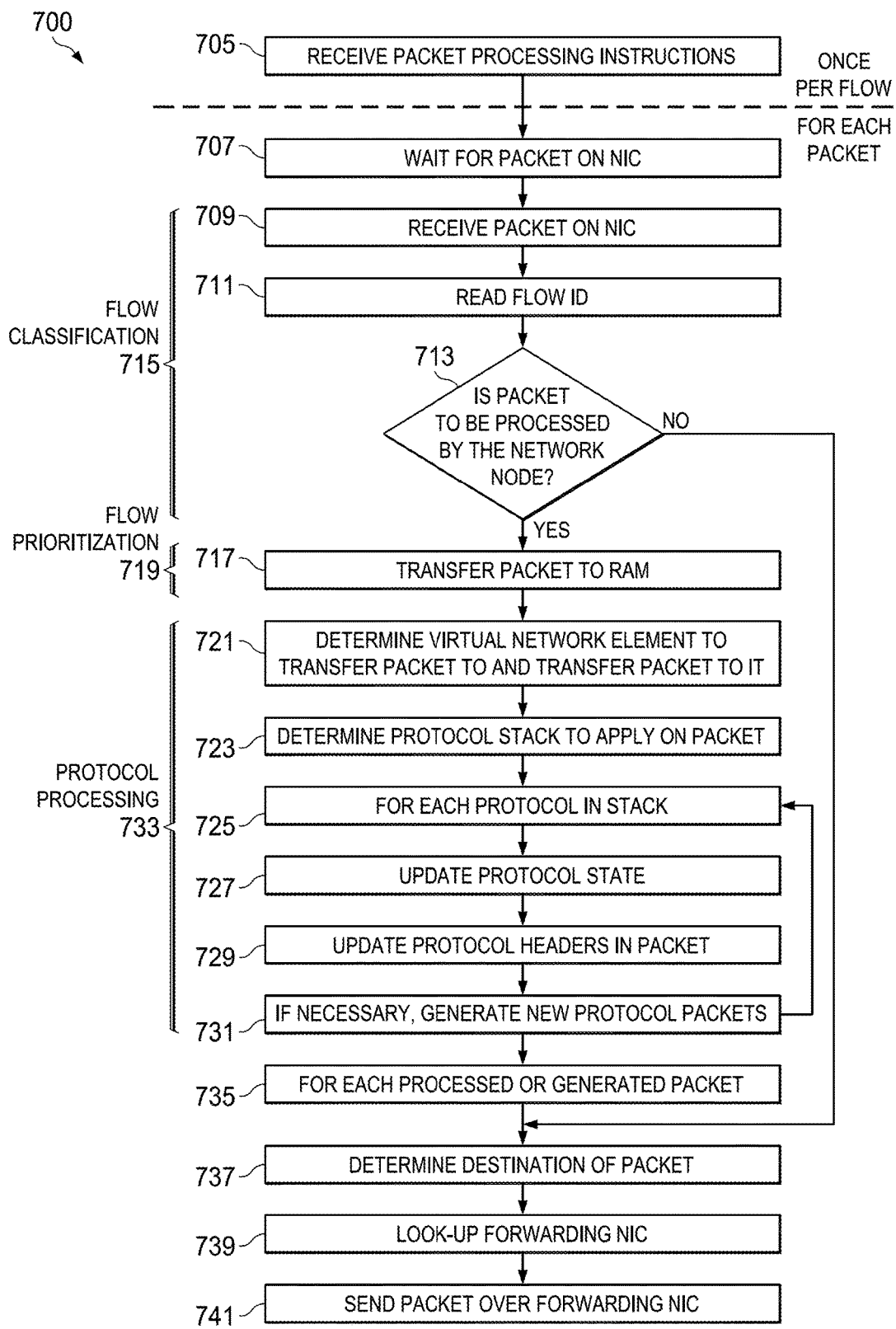
FIG. 7 illustrates a flow diagram of example operations occurring in a software protocol engine as the software protocol engine processes packets according to example embodiments described herein.

FIG. 7 illustrates a flow diagram of example operations 700 occurring in a software protocol engine as the software protocol engine processes packets. Operations 700 may be indicative of operations occurring in a software protocol engine, such as software protocol engine 500 or software protocol engine 600, of a SDP network node as the software protocol engine processes packets.

Operations 700 may begin with the software protocol engine receives packet processing instructions (block 705). The software protocol engine (or a SDP node management unit therein) may receive the packet processing instructions from a SDP manager. The software protocol engine may receive the packet processing instructions once per packet flow. The software protocol engine may wait for packets to arrive on a NIC of the SDP network node (block 707). The software protocol engine may wait for the NIC to receive the packet (block 709).

The software protocol engine may read the flow identifier (flow ID) of the packet (block 711). In general, the software protocol engine parses at least a part of the header of the packet to determine if the packet is to receive protocol processing and reading the flow identifier is an example technique that the software protocol engine may use to determine if the packet is to receive protocol processing. The software protocol engine may perform a check to determine if the packet is to be processed by the SDP network node, i.e., if the packet is to receive protocol processing (block 713). Collectively, blocks 711 and 713 may be referred to as flow classification (blocks 715).

If the packet is to be processed by the SDP network node, the software protocol engine may transfer the packet to memory, e.g., RAM (block 717). The software protocol engine may apply a prioritizing to the packet as it is transferred to the memory. Block 717 may also be referred to as flow prioritization (block 719).

The software protocol engine may determine, e.g., select, a VNN for the packet and transfer the packet to the VNN (block 721). The software protocol engine may determine, e.g., select, a protocol stack to apply to the packet (block 723). For each protocol (block 725), the software protocol engine may apply the protocol to the packet and update the protocol state (block 727) and update protocol headers in the packet (block 729). The software protocol engine may check to determine if there are new protocol packets to generate (block 731). If new protocol packets are to be generated, the software protocol engine may return to block 725 for further protocol processing. Collectively, blocks 721-731 may be referred to as protocol processing (blocks 733).

If the generation of new protocol packets is not necessary, the software protocol engine may, for each processed or generated packet (block 735), determine a destination of the packet (block 737), lookup a forwarding NIC (block 739), and send the packet to the forwarding NIC (block 741).

If the packet is not to be processed by the SDP network node (block 713), the software protocol engine may a destination of the packet (block 737), lookup a forwarding NIC (block 739), and send the packet to the forwarding NIC (block 741).

As discussed previously, monolithic processing may process all protocols for a packet flow using a single thread. With monolithic processing, it may be possible to distribute protocol processing on multiple CPUs if there is no dependency between the protocols. With layered protocol processing, the protocols are processed sequentially, which allows for interruption of the protocol sequence. A single queue may be used per packet flow or a single queue may be used per protocol, thereby simplifying flow prioritization or protocol prioritization.

Flow packet prioritization may be achieved by prioritizing packet processing. With monolithic workflow, prioritization may be performed at the incoming packet queue, while with layered processing, further prioritization may be implemented at workflow queues. A wide range of packet scheduling disciplines may be used, including weighted round robin, earliest deadline first, and the like. Packet flow priority may also be achieved by assigning more CPUs. In the layered approach, assigning more CPUs means that more than one packet of a single packet flow may be processed at the same time giving some packet flows higher processing throughput. Similarly, more than one packet of the same protocol type may be processed at the same time giving some protocols higher processing throughput.

Figures 8A, 8B:
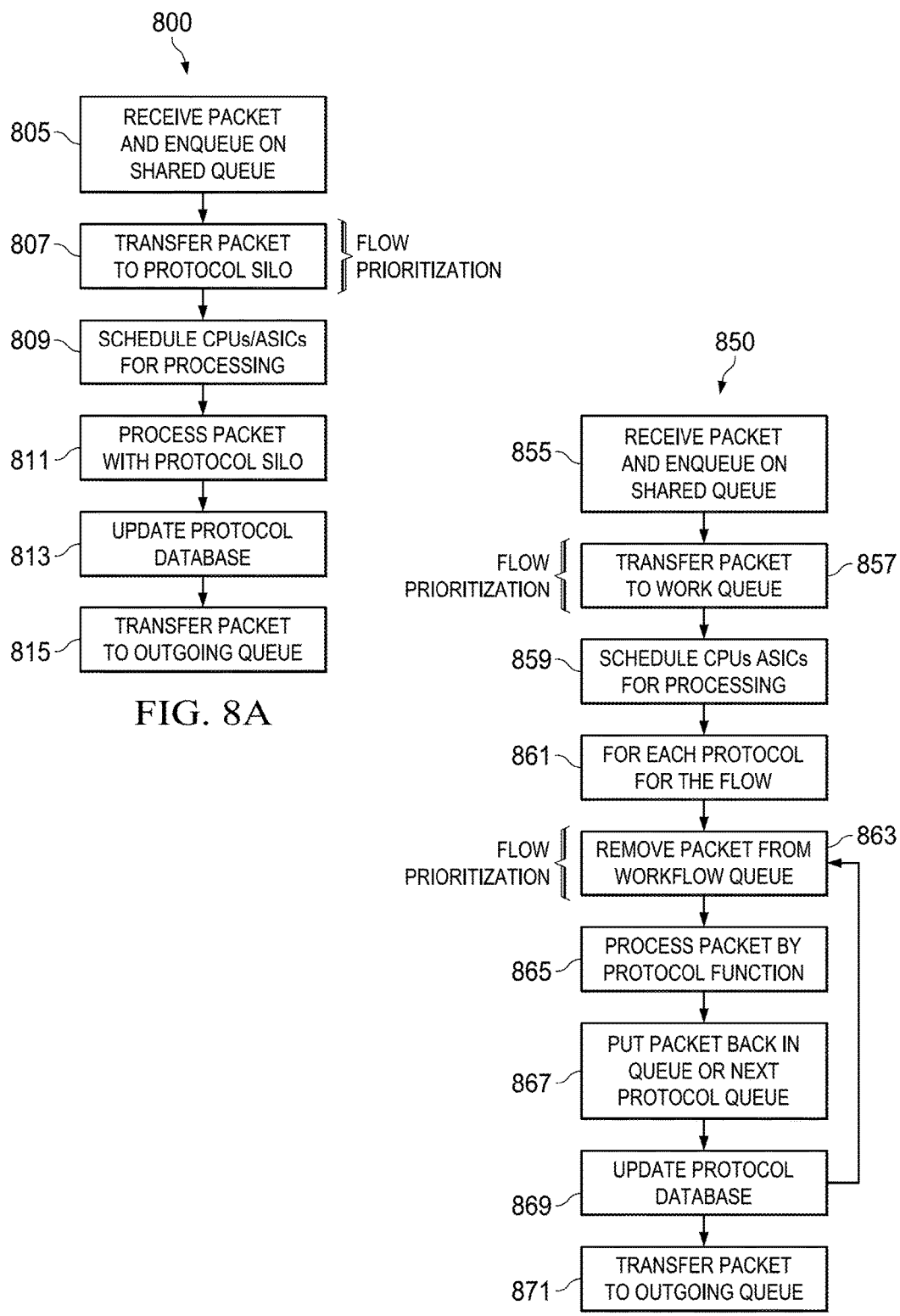
FIG. 8a illustrates a flow diagram of example operations occurring in a software protocol engine providing packet flow prioritization utilizing monolithic processing according to example embodiments described herein.
FIG. 8b illustrates a flow diagram of example operations occurring in a software protocol engine providing packet flow prioritization utilizing layered processing according to example embodiments described herein.

FIG. 8a illustrates a flow diagram of example operations 800 occurring in a software protocol engine providing packet flow prioritization utilizing monolithic processing. Operations 800 may be indicative of operations occurring in a software protocol engine, such as software protocol engine 500 or software protocol engine 600, of a SDP network node as the software protocol engine provides packet flow prioritization utilizing monolithic processing.

Operations 800 may begin with the SDP network node receiving a packet and the software protocol engine placing the packet in a shared queue (block 805). The software protocol engine may transfer the packet to a protocol silo (block 807). The software protocol engine (e.g., a dispatcher) may schedule the packet to CPUs and/or ASICs for processing (block 809). The packet may be processed using the protocol silo (block 811) and the results of the processing may be used to update the protocol database (block 813). The software protocol engine may transfer the packet to the outgoing packet queue (block 815).

FIG. 8b illustrates a flow diagram of example operations 850 occurring in a software protocol engine providing packet flow prioritization utilizing layered processing. Operations 850 may be indicative of operations occurring in a software protocol engine, such as software protocol engine 500 or software protocol engine 600, of a SDP network node as the software protocol engine provides packet flow prioritization utilizing layered processing.

Operations 850 may begin with the SDP network node receiving a packet and the software protocol engine placing the packet in a shared queue (block 855). The software protocol engine may transfer the packet to a work queue (block 857). The software protocol engine (e.g., a dispatcher) may schedule the packet to CPUs and/or ASICs for processing (block 859). For each protocol in the packet flow (block 861), the software protocol engine may remove the packet from the work queue (block 863) and process the packet by protocol function using the CPUs and/or ASICs (block 865). The software protocol engine may transfer the packet back into the work queue or in queue of a next protocol (block 867) and update the protocol database (block 869). The software protocol engine may return to block 863 if there are further packets in the work queue. The software protocol engine may transfer the packet to the outgoing packet queue (block 871).

According to an example embodiment, virtualization may permit the simultaneous co-existence of multiple VNNs on a single SDP network node. An example use of VNNs is that each VNN of a SDP network node may belong to a single virtual network provider to allow for security and data separation. The hardware of a SDP network node is shared by multiple VNNs. VNNs may be implemented in a virtual machine on the SDP network node. A virtual network may be assigned to one VNN on a given SDP network node. Multiple VNNs may be assigned to one virtual network node on a given SDP network node.

According to an example embodiment, a VNN manager may reside in the SDP network node. The VNN manager may be instructed about a mapping of virtual network to VNN by a SDP manager through policy rule sets or specific commands (e.g., transfer packet flow from a first VNN to a second VNN, transfer virtual networks from a first VNN to a second VNN, and the like). The VNN manager may transfer virtual network content and/or flow context between VNNs. The VNN manager may also assign hardware resources, such as CPUs, ASICs, memory, and the like, to the VNNs.

A shared virtual network node (S-VNN) may allow for the sharing of hardware resources between different virtual networks. In general, there may be a single S-VNN for a physical element without virtualization. Best effort sharing of hardware resources may be provided without separation of memory between the virtual networks or packet flows.

A dedicated virtual network node (D-VNN) may allow for the assignment of hardware resources to virtual network, through the use of virtual machines, for example. D-VNNs may provide a hard sharing of hardware resources, such as CPUs, ASICs, memory, and the like. A SDP network node hypervisor may re-balance the use of hardware resources to meet quality of service (QoS) requirements. D-VNN may provide full separation of memory between virtual networks or packet flows.

Figure 9:
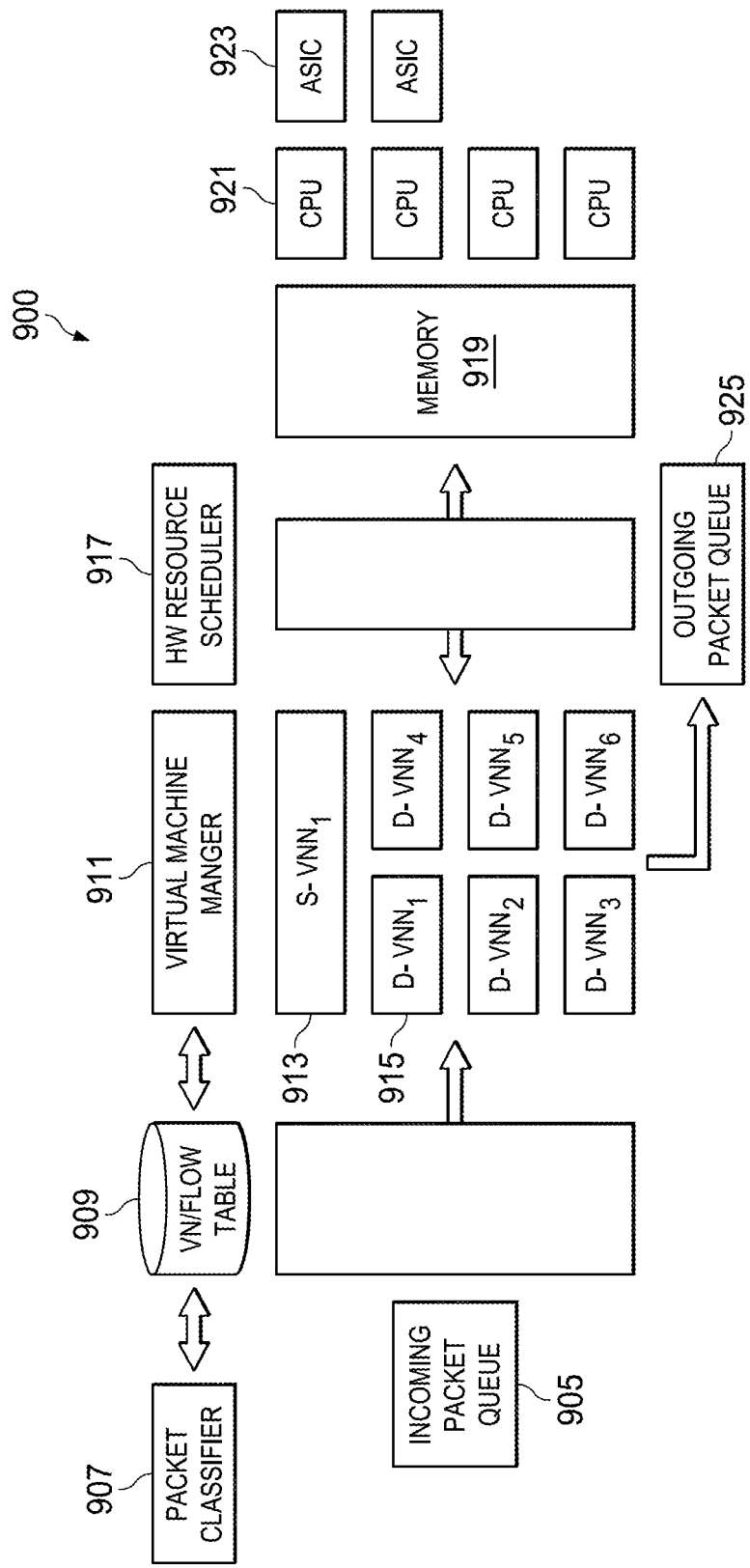
FIG. 9 illustrates architecture of an example VNN according to example embodiments described herein.

FIG. 9 illustrates architecture of an example VNN 900. A packet arriving at a SDP node associated with VNN 900 may be received in an incoming packet queue 905. A packet classifier 907 may assign a virtual resource (e.g., a VNN) for processing the packet. Packet classifier 907 may use information stored in a virtual network and/or flow table 909 to assign the virtual resource to the packet. Virtual network and/or flow table 909 includes information about mappings of packet flows to virtual networks with optional virtual network identifiers. Packet classifier 907 may sort the packet(s) and assign the packet(s) to the VNNs. The virtual resource may include S-VNN 913 and a plurality of D-VNNs, such as D-VNN 915, which may be controlled by a virtual machine manager 911. A hardware resource scheduler 917 may assign a CPU and/or ASIC to the virtual resource. The packet may be transferred to memory 919, processed by the virtual resource using one or more of the CPUs (such as CPU 921) and/or one or more ASICs (such as ASIC 923), and transferred back to memory 919 or an outgoing packet queue 925. Packets transferred to outgoing packet queue 925 may be scheduled to meet timing deadlines, QoS requirements, and the like.

Figure 10:
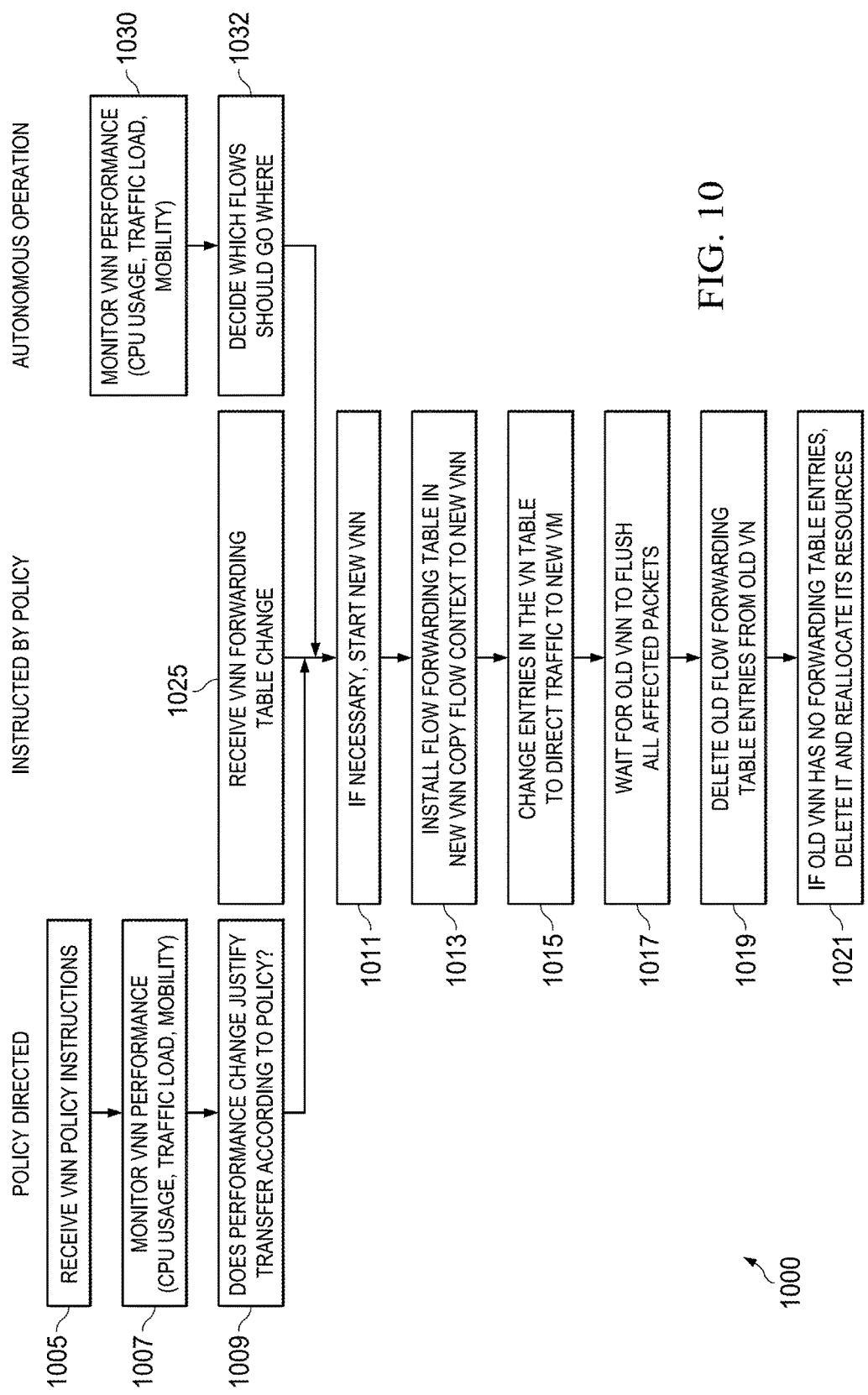
FIG. 10 illustrates a flow diagram of example operations occurring at a VNN manager according to example embodiments described herein.

FIG. 10 illustrates a flow diagram of example operations 1000 occurring at a VNN manager. Operations 1000 may be indicative of operations occurring at a VNN manager. Operations 1000 illustrates policy directed, instructed by policy, and autonomous operation by the VNN manager.

In policy directed operation, operations 1000 may begin with the VNN manager receiving VNN policy instructions from a SDP manager (block 1005). The VNN manager may monitor VNN performance (block 1007). As an example, the VNN manager may monitor CPU usage, traffic load, mobility, and the like. The VNN manager may perform a check to determine if a change in performance resulting from a VNN transfer in accordance with the VNN policy instruction is justified (block 1009). If the change in performance is justified, the VNN manager may start a new VNN if needed (block 1011) and install a packet flow forwarding table in a new VNN flow context to the new VNN (block 1013). The VNN manager may change entries in the virtual network table to direct traffic to the new VNN (block 1015) and wait for the old VNN to finish processing (flush) all of its affected packets (block 1017). The VNN manager may delete old packet flow forwarding entries from the packet flow forwarding table of the old VNN (block 1019). If the packet flow forwarding table of the old VNN is no entries, the VNN manager may delete the old VNN and reallocate its resources (block 1021).

In instructed by policy operation, operations 1000 may begin with the VNN manager receiving a VNN forwarding table change message from the SDP manager (block 1025). The VNN manager may start a new VNN if needed (block 1011) and install a packet flow forwarding table in a new VNN flow context to the new VNN (block 1013). The VNN manager may change entries in the virtual network table to direct traffic to the new VNN (block 1015) and wait for the old VNN to finish processing (flush) all of its affected packets (block 1017). The VNN manager may delete old packet flow forwarding entries from the packet flow forwarding table of the old VNN (block 1019). If the packet flow forwarding table of the old VNN is no entries, the VNN manager may delete the old VNN and reallocate its resources (block 1021).

In autonomous operation, operations 1000 may begin with the VNN manager monitoring VNN performance (block 1030). As an example, the VNN manager may monitor CPU usage, traffic load, mobility, and the like. The VNN manager may decide which packet flows should go to which VNN (block 1032). The VNN manager may start a new VNN(s) if needed (block 1011) and install a packet flow forwarding table in a new VNN flow context to the new VNN (block 1013). The VNN manager may change entries in the virtual network table to direct traffic to the new VNN (block 1015) and wait for the old VNN to finish processing (flush) all of its affected packets (block 1017). The VNN manager may delete old packet flow forwarding entries from the packet flow forwarding table of the old VNN (block 1019). If the packet flow forwarding table of the old VNN is no entries, the VNN manager may delete the old VNN and reallocate its resources (block 1021).

According to an example embodiment, the VNN manager may move packet flows or virtual networks when a SDP manager sends direct instructions to the VNN manager. As an example, the SDP manager may specify a list of virtual networks and packet flows for old VNN(s) and new VNN(s). The VNN manager may move packet flows or virtual networks when the SDP manager sends policy to the VNN manager. As an example, policy may be a set of thresholds for quality of experience (QoE), QoS, CPU load, memory load, and the like. Furthermore, policy may specify how to move the packet flows as the UE moves about the communications system. Additionally, policy may be based on security requirements, with packet flows with no security being moved to shared virtual machines, for example. The VNN manager may move packet flows or virtual networks with the SDP manager autonomously moving packet flows to achieve an optimization objective. As an example, the moves may optimize utilization of resources. A threshold may be used to move from shared resources to dedicated resources if utilization of the shared resource exceeds a specified amount. Similarly, a threshold may be used to move from dedicated resources to shared resources if dedicated utilization meets a specified value and the dedicated resource may be eliminated.

Figure 11:
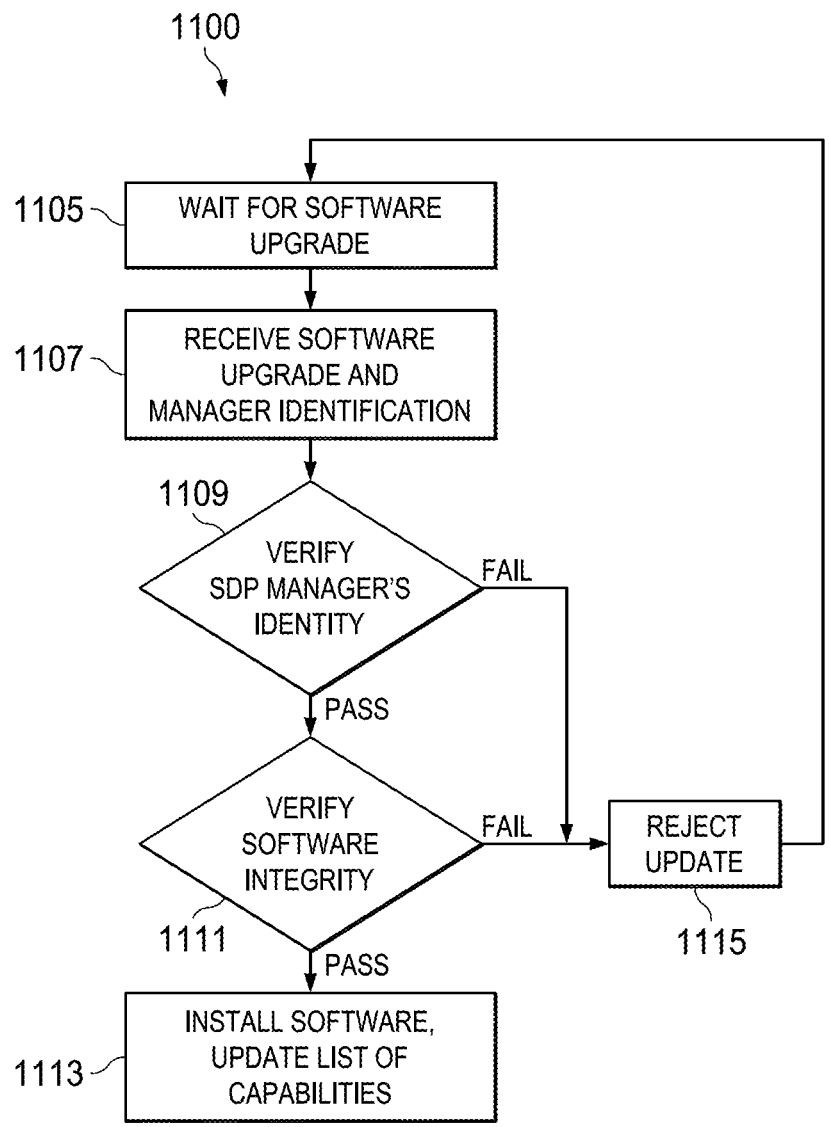
FIG. 11 illustrates a flow diagram of example operations occurring in a SDP network node as the SDP network node upgrades and/or installs software according to example embodiments described herein.

FIG. 11 illustrates a flow diagram of example operations 1100 occurring in a SDP network node as the SDP network node upgrades and/or installs software. Operations 1100 may be indicative of operations occurring in a SDP network node, such as SDP network node 209, as the SDP network node upgrades and/or installs software.

Operations 1100 may begin with the SDP network node waiting for a software update (block 1105). It is noted that while the SDP network node is waiting for the software update, it may be performing other operations. The SDP network node may receive the software update along with identification of the SDP manager (block 1107). The SDP network node may verify the identity of the SDP manager (block 1109). The SDP manager may be identified using a digital certificate. As an example, a central certification authority may be used or the certificate may be cache from an earlier use. If the identity of the SDP manager is verified, the SDP network node may verify the integrity of the software update (block 1111). As an example, the integrity of the software update may be checked with a check-sum hash (e.g., using hashing functions such as md5, sha-256, and the like). A virtual machine hypervisor may assist in the authentication of the software update. It is noted that if the update is for all the protocols on the SDP node, or for the entire software on the SDP node, only SDP manager identification may be sufficient. If a specific protocol is updated, the update may include an identifier of the protocol being updated or a new identifier of the updated protocol to be used after the update for the purposes of PIB. If the integrity of the software update is verified, the SDP network node may install the software update and update its list of capabilities (block 1113). Installed protocols may be stored in a database with their names mapped to binary addresses or function names that can be reference when the protocol is invoked. The protocols may be installed in shared memory so that they may be used by multiple VNNs in a manner similar to linux shared object libraries. As an example, a database similar to component object model (COM) registry key or a function table in dynamically linked libraries (DLLs) may be used. If either of the verification of the identity of the SDP manager or the integrity of the software update fails, the SDP network node may reject the software update (block 1115) and wait for a further update (block 1105).

Although the present disclosure and its advantages have been described in detail, it should be understood that various changes, substitutions and alterations can be made herein without departing from the spirit and scope of the disclosure as defined by the appended claims.

What is claimed is:

1. A software designed protocol (SDP) network node comprising:
    a receiver configured to receive instructions, and to receive packets including at least a first packet; and
    a processor operatively coupled to the receiver, the processor configured to:
        update a configuration of a protocol stack supported by the SDP network node including at least one of processing instructions, a workflow sequence description, a packet flow identifier, and a protocol supported by the protocol stack in accordance with the received instructions;
        process the received packets in accordance with the updated configuration of the protocol stack;
        transfer the first packet to memory in response to determining that the first packet is to be processed by the SDP network node in accordance with a software description included in the received instructions for implementing the protocol; and
        forward the first packet to a destination of the first packet in response to determining that the first packet is not to be processed by the SDP network node.

2. The SDP network node of claim 1, wherein the receiver is configured to receive the instructions from a software designed networking (SDN) controller.

3. The SDP network node of claim 1, wherein the software description describes a protocol supported by the protocol stack, and wherein the processor is configured to verify the software description, and to store the software description.

4. The SDP network node of claim 1, wherein the processor is configured to dispatch the received packets.

5. The SDP network node of claim 4, wherein the processor is configured to dispatch the received packets in at least one of a horizontal manner and a vertical manner.

6. A method for operating a software designed protocol (SDP) network node, the method comprising:
    receiving, by the SDP network node, processing instructions comprising a software description for implementing a protocol;
    receiving, by the SDP network node, a first packet;
    classifying, by the SDP network node, the first packet, in accordance with identifying information in the first packet;
    processing, by the SDP network node, the first packet in accordance with the software description for implementing the protocol in response to the first packet being classified as a packet to be handled in accordance with the protocol; and
    forwarding the first packet to a destination of the first packet in response to the first packet being classified as a packet not to be processed by the SDP network node.

7. The method of claim 6, wherein the processing instructions further comprise a workflow sequence description.

8. The method of claim 6, wherein the processing instructions are received from a software designed networking (SDN) controller.

9. The method of claim 6, wherein the processing instructions further comprise packet flow identifiers and protocols, wherein the packet flow identifiers are associated with the protocols.

10. The method of claim 6, wherein classifying the first packet comprises:
    parsing a flow identifier of the first packet; and
    transferring the first packet to memory in response to determining that the first packet is to be processed by the SDP network node in accordance with the software description for implementing the protocol.

11. The method of claim 6, wherein processing the classified packet comprises:
    transferring the first packet to a network element;
    processing the first packet in accordance with the protocol to produce a processed packet, the protocol being part of a protocol stack supported by the SDP node; and
    forwarding the processed packet to a destination of the processed packet.

12. The method of claim 11, wherein the network element comprises a virtual network element.

13. The method of claim 11, wherein processing the first packet in accordance with the protocol comprises updating a protocol state.

14. The method of claim 11, wherein processing the first packet in accordance with the protocol comprises one of adding a first protocol header to the first packet and adding a second protocol header to the first packet.

15. The method of claim 11, wherein processing the first packet in accordance with the protocol comprises generating a second packet.

16. A method for operating a software designed protocol (SDP) network node, the method comprising:
    receiving, by the SDP network node, instructions and packets including at least a first packet; updating, by the SDP network node, a configuration of a protocol stack supported by the SDP network node including at least one of processing instructions, a workflow sequence description, a packet flow identifier, and a protocol supported by the protocol stack in accordance with the received instructions;

processing, by the SDP network node, the received packets in accordance with the updated configuration of the protocol stack;

transferring, by the SDP network node, the first packet to memory in response to determining that the first packet is to be processed by the SDP network node in accordance with a software description included in the received instructions for implementing the protocol; and forwarding, by the SDP network node, the first packet to a destination of the first packet in response to determining that the first packet is not to be processed by the SDP network node.

17. The method of claim 16, wherein the instructions are received from a software designed networking (SDN) controller.

18. The method of claim 16, wherein the software description describes a protocol supported by the protocol stack, and wherein the SDP network node is configured to verify the software description, and to store the software description.

19. The method of claim 16, further comprising dispatching the received packets.

20. The method of claim 19, wherein received packets are dispatched in at least one of a horizontal manner and a vertical manner.

21. The SDP network node of claim 1, wherein the receiver is further configured to receive a second packet, and wherein the processor is further configured to transfer the second packet to a network element, process the second packet in accordance with the protocol to produce a processed packet, and to forward the processed packet to a destination of the processed packet, the protocol being part of a protocol stack supported by the SDP node.

* * * * *